US 9,381,840 B2

(12) United States Patent
Tobata et al.

(10) Patent No.: US 9,381,840 B2
(45) Date of Patent: Jul. 5, 2016

(54) SEAT

(71) Applicant: TACHI-S CO., LTD., Akishima-shi, Tokyo (JP)

(72) Inventors: Hideo Tobata, Ome (JP); Atsushi Koike, Ome (JP); Tomohiro Amano, Ome (JP); Shogo Suzuki, Ome (JP)

(73) Assignee: TACHI-S CO., LTD. (JP)

( * ) Notice: Subject to any disclaimer, the term of this patent is extended or adjusted under 35 U.S.C. 154(b) by 0 days.

(21) Appl. No.: 14/546,686

(22) Filed: Nov. 18, 2014

(65) Prior Publication Data
US 2015/0165949 A1 Jun. 18, 2015

(30) Foreign Application Priority Data

Nov. 18, 2013 (JP) ................................. 2013-237968

(51) Int. Cl.
*B60N 2/20* (2006.01)
*B60N 2/64* (2006.01)
*B60N 2/68* (2006.01)
*B60N 2/16* (2006.01)
*B60N 2/22* (2006.01)

(52) U.S. Cl.
CPC *B60N 2/643* (2013.01); *B60N 2/16* (2013.01); *B60N 2/20* (2013.01); *B60N 2/22* (2013.01); *B60N 2/646* (2013.01); *B60N 2/686* (2013.01); *B60N 2002/2204* (2013.01)

(58) Field of Classification Search
CPC ............. B60N 2/16; B60N 2/20; B60N 2/22; B60N 2/686; B60N 2/643; B60N 2/646
USPC ............... 297/452.29, 452.3, 452.31, 452.32, 297/452.33, 452.34, 452.35, 440.15, 297/440.16, 354.1, 354.11, 354.12, 358, 297/361.1, 362.11, 408
See application file for complete search history.

(56) References Cited

U.S. PATENT DOCUMENTS

| | | | | |
|---|---|---|---|---|
| 3,762,769 A | * | 10/1973 | Poschl | A47C 7/462 297/284.4 |
| 3,794,382 A | * | 2/1974 | Bloomfield | A47C 7/282 297/452.3 X |
| 4,679,854 A | * | 7/1987 | Putsch | B60N 2/00 297/216.13 |
| 4,902,070 A | * | 2/1990 | Casale | A47D 11/02 296/68.1 |
| 5,011,225 A | * | 4/1991 | Nemoto | B60N 2/4852 297/408 |
| 5,018,788 A | * | 5/1991 | Cedergreen | A47C 3/16 297/378.1 |
| 5,040,848 A | * | 8/1991 | Irie | A47C 7/46 297/452.31 X |
| 5,048,894 A | * | 9/1991 | Miyajima | B60N 2/38 297/452.35 X |
| 5,085,488 A | * | 2/1992 | Dal Monte | B60N 2/5635 297/452.31 |
| 5,114,209 A | * | 5/1992 | Dunn | A47C 7/425 297/452.3 X |
| 5,123,706 A | * | 6/1992 | Granzow | B60N 2/68 297/452.34 X |
| 5,316,375 A | * | 5/1994 | Breen | A47C 7/425 297/452.34 X |

(Continued)

FOREIGN PATENT DOCUMENTS

| | | | | |
|---|---|---|---|---|
| DE | 3440985 A1 | * | 5/1986 | ............. A47C 7/462 |
| DE | 19845011 A1 | * | 4/2000 | ............... B60N 2/16 |

(Continued)

*Primary Examiner* — Rodney B White
(74) *Attorney, Agent, or Firm* — Cantor Colburn LLP

(57) ABSTRACT

The seatback has a seat surface curving and gradually bulging in the up-down direction, along the occupant's shoulder blades, and curving in the left-right direction and receding to support the occupant's ribs. Preferably, the seat surface of the seatback extends upward to support the lower part of the occupant's neck, thus supporting the same in the up-down direction, and recedes to support the occupant's shoulder blades in the left-right direction.

4 Claims, 10 Drawing Sheets

(56) References Cited

U.S. PATENT DOCUMENTS

| | | | | |
|---|---|---|---|---|
| 5,549,357 A * | 8/1996 | Counts | A61G 5/1067 297/354.13 X |
| 5,769,498 A * | 6/1998 | Smith | B60N 2/449 297/452.34 X |
| 5,836,648 A * | 11/1998 | Karschin | B60N 2/2222 297/354.12 X |
| 6,015,189 A * | 1/2000 | Broadhead | A61G 5/1067 297/358 |
| 6,139,109 A * | 10/2000 | Lajoie | A47C 3/12 297/452.34 X |
| 6,390,554 B1 * | 5/2002 | Eakins | A61G 5/006 297/317 |
| 6,409,265 B1 * | 6/2002 | Koerlin | A61G 5/006 297/325 |
| 6,425,635 B1 * | 7/2002 | Pulver | A61G 5/107 297/325 |
| 6,450,581 B1 * | 9/2002 | Koerlin | A61G 5/12 297/423.26 |
| 6,530,622 B1 * | 3/2003 | Ekern | B60N 2/2222 297/354.11 X |
| 6,550,858 B1 * | 4/2003 | Grohs | B60N 2/4256 297/452.33 X |
| 6,578,917 B1 * | 6/2003 | Aubert | B60N 2/002 297/317 |
| 6,702,377 B2 * | 3/2004 | Nakano | B60N 2/4808 297/408 X |
| 6,752,464 B1 * | 6/2004 | Tseng | A47C 4/02 297/440.16 X |
| 6,817,673 B2 * | 11/2004 | Walker | B60N 2/002 297/440.2 |
| 6,969,114 B2 * | 11/2005 | Keilhauer | A47C 7/425 297/452.3 X |
| 7,021,706 B2 * | 4/2006 | Aufrere | B60N 2/7029 297/216.13 |
| 7,021,710 B2 * | 4/2006 | Kain | B60N 2/2851 297/440.15 X |
| 7,040,708 B2 * | 5/2006 | Black | B60N 2/24 297/452.34 |
| 7,168,765 B2 * | 1/2007 | Meiller | B60N 2/242 297/452.34 X |
| 7,237,847 B2 * | 7/2007 | Hancock | B60N 2/0228 297/284.4 |
| 7,296,856 B2 * | 11/2007 | Rozaieski | A61G 5/1067 297/354.12 |
| 7,401,855 B2 * | 7/2008 | Kohl | B60N 2/4415 297/284.1 |
| 7,488,026 B1 * | 2/2009 | Jovicevic | B60N 2/0725 296/65.13 |
| 7,547,068 B2 * | 6/2009 | Davis | B60N 2/2222 297/354.12 X |
| 7,611,199 B2 * | 11/2009 | Michalak | B60N 2/0232 297/284.9 |
| 7,686,394 B2 * | 3/2010 | Nishikawa | B60N 2/2222 297/354.11 X |
| 8,262,163 B2 * | 9/2012 | Wu | A47C 1/035 297/354.13 X |
| 8,646,795 B2 * | 2/2014 | Cerreto | A61G 5/1067 297/354.12 X |
| 8,857,908 B2 * | 10/2014 | Brncick | B60N 2/0232 297/452.31 X |
| 8,876,206 B2 * | 11/2014 | Yamaguchi | B60N 2/4228 297/440.2 X |
| 8,936,317 B2 * | 1/2015 | Yamaguchi | B60N 2/4228 297/452.31 |
| 8,979,203 B1 * | 3/2015 | Sutter, Jr. | B60N 2/4844 297/408 |
| 9,061,616 B2 * | 6/2015 | Kondrad | B60N 2/22 297/408 |
| 9,090,189 B2 * | 7/2015 | Kulkarni | B60N 2/643 297/284.1 |
| 9,096,147 B2 * | 8/2015 | Kulkarni | B60N 2/028 297/284.1 |
| 2001/0052722 A1 * | 12/2001 | Amorin | B60N 2/20 297/378.1 |
| 2004/0195895 A1 * | 10/2004 | Sedlatschek | A47C 7/38 297/408 |
| 2005/0189810 A1 * | 9/2005 | Wu | A47C 7/38 297/452.29 |
| 2006/0082208 A1 * | 4/2006 | Beermann | B60N 2/22 297/452.11 |
| 2006/0138848 A1 * | 6/2006 | Balensiefer | B60N 2/2866 297/440.16 |
| 2006/0250008 A1 * | 11/2006 | Kohl | A47C 7/46 297/452.33 X |
| 2008/0079298 A1 * | 4/2008 | Whelan | A47C 7/405 297/284.2 |
| 2008/0136240 A1 * | 6/2008 | Matthews | B60N 2/4235 297/354.1 |
| 2009/0051202 A1 * | 2/2009 | Ozeki | B60N 2/20 297/341 |
| 2009/0236884 A1 * | 9/2009 | Lawall | B60N 2/22 297/217.3 |
| 2011/0241403 A1 * | 10/2011 | Yamaguchi | B60N 2/4228 297/452.31 |
| 2011/0279282 A1 * | 11/2011 | Bryant | B60N 2/06 340/686.1 |
| 2013/0088066 A1 * | 4/2013 | Sasaki | B60N 2/16 297/452.38 |
| 2013/0328364 A1 * | 12/2013 | Cecinas | B60N 2/20 297/354.1 X |
| 2014/0203611 A1 * | 7/2014 | Kondrad | B60N 2/22 297/354.12 |
| 2014/0239695 A1 * | 8/2014 | Miller | B60N 2/20 297/378.12 |
| 2015/0080994 A1 * | 3/2015 | Ho | A47C 7/46 297/452.3 X |

FOREIGN PATENT DOCUMENTS

| | | | | |
|---|---|---|---|---|
| DE | 102006002069 A1 * | 7/2007 | | B60N 2/16 |
| DE | 102007062635 A1 * | 6/2009 | | B60N 2/0881 |
| DE | 102009052709 A1 * | 5/2011 | | B60N 2/0296 |
| JP | H01147131 U | 10/1989 | | |
| JP | 2011084207 A | 4/2011 | | |
| WO | WO 2014127355 A1 * | 8/2014 | | B60N 2/4802 |

* cited by examiner

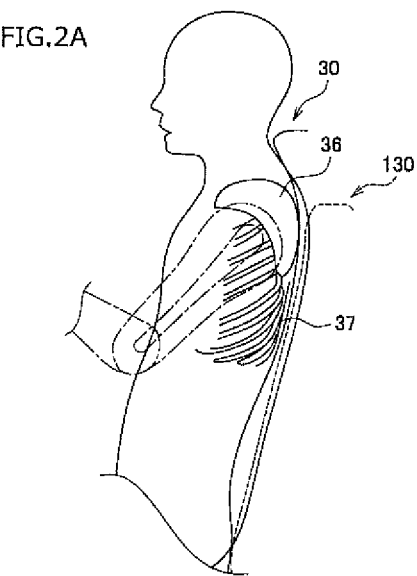
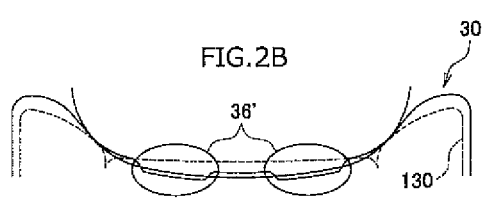
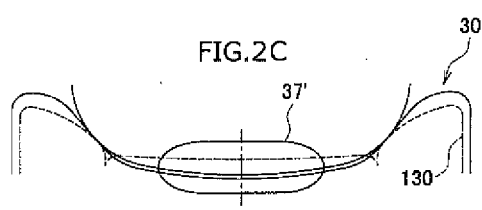

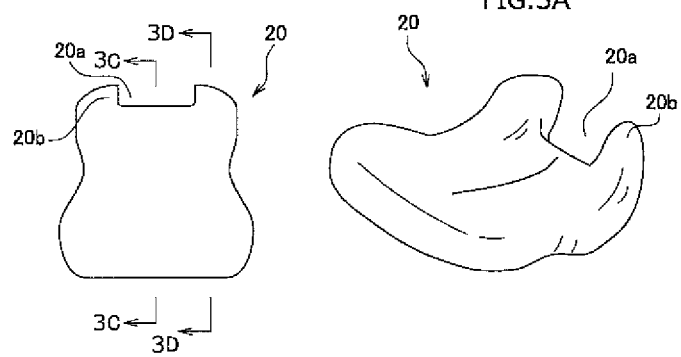

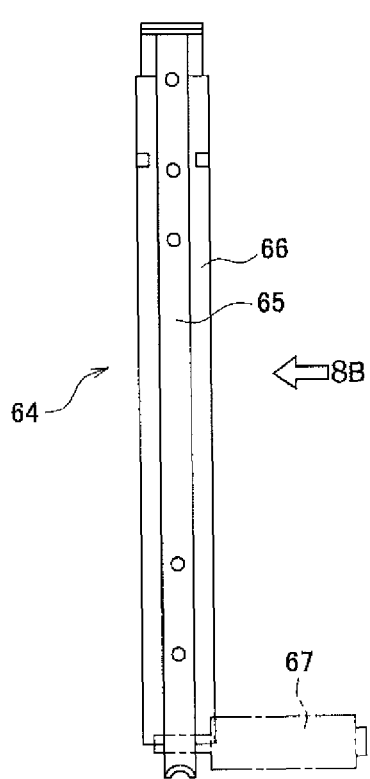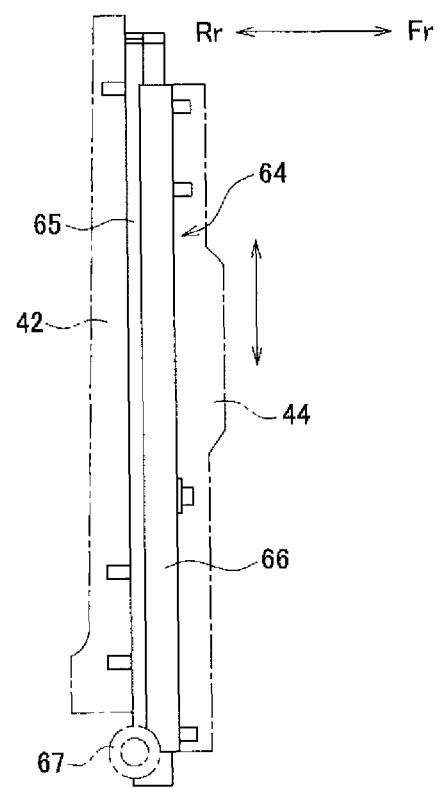

SEAT

CROSS-REFERENCE TO RELATED APPLICATIONS

This application is based upon and claims the benefit of priority from the prior Japanese Patent Application No. 2013-237968, filed Nov. 18, 2013, the entire contents of which are incorporated herein by reference.

BACKGROUND OF THE INVENTION

1. Field of the Invention

This invention relates to a seat that has a front surface of the seatback (i.e., seat surface of the seatback) that can contact the occupant's back at a large area.

2. Description of the Related Art

Any seat should be make the occupant feel well fit in it when seated on it. A vehicle seat, for example, must be so designed that the occupant may feel well fit in it, thus reducing his or her fatigue resulting from a long sitting in the same posture. The fatigue is reduced by, for example, increasing the contact area at which the occupant's back contacts the seat surface of the seatback, thus making the occupant feel well fit in the seat.

A seat having an increased contact area is known. The seat has two ridge-shaped bulging parts called "side supports," at the left and right edges of the seatback. The side supports cover the left and right sides of the occupant, respectively. In most cases, the side supports are formed integral with the seatback. Therefore, they may or may not support the occupant well, depending on the occupant's physique (particularly, trunk width). If the occupant is of the average physique (having the average trunk width), the side supports hold him or her, as if wrapping the sides from the left and right, respectively. As a result, the occupant's back contacts the seat surface of the seatback, at a large area and at an appropriate pressure, making the occupant feel well fit in the seat.

If the occupant is a small person (i.e., slender person with a narrow trunk), however, there will be gaps, each between either side of the occupant and the side support facing the side. Due to the gaps, the side supports fail to support the occupant at the left side or the right side. Consequently, no sufficient contact area is provided between at the occupant's back and the seat surface, and the occupant cannot feel well fit in the seat. If the occupant is a big person (i.e., fatty person with a broad trunk), his or her back will push the side supports, as if collapsing the side supports. In this case, the contact pressure is high, making the occupant feel something strange. As a result, the occupant cannot feel well fit in the seat.

Most seatbacks are formed substantially flat. This is why the occupant's back, particularly the shoulder blades, is greatly pushed to the seat surface of the seatback in most cases. The contact pressure is therefore high at that part of the seatback, which contacts the shoulder blades, and the contact area is small. As a consequence, the occupant cannot feel well fit in the seat.

In the seat disclosed in JP 2011-084207A, for example, the wadding (i.e., elastic layer) interposed between the pad and trim cover of the seatback is thicker at the inner part than at outer parts that contact the side supports. The wadding may therefore cushion the occupant more at the inner side of either side support than at the outer side thereof. The thick inner part of the wadding, which lies between the side supports, undergoes elastic deformation. This makes the occupant feel well fit in the seat.

JP 01-147131U (JP 05-034430Y) discloses a seat so designed that the seat surface of the seatback may well support the occupant's shoulder blades. The pad of this seat incorporates two air mats, respectively at the left and right parts the seat surface of the seatback, which support the shoulder blades. If the occupant's shoulder blades push the seat surface of the seatback, the air mats will be deformed, and the seat surface of the seatback will softly support the shoulder blades. Therefore, the shoulder blades would not be strongly pushed to the seat surface of the seatback, and the air mats is well deformed. As the air mats are deformed, the seat surface of the seatback goes into close contact with the occupant's shoulder blades, providing a large contacting area. Thus, the seat surface of the seatback can support the occupant's back, making him or her feel well fit in the seat. The left and right side supports are not disclosed in the drawings.

If the cushion of the inner side of either support provided on the seat surface of the seatback is enough large and the wadding of the inner side of either side support is enough broad, a large contact area can be provided without increasing the contact pressure, no matter whether the occupant is small or big. The occupant can therefore feel well fit in the seat. If the wadding is thick and broad inside the side supports, however, the seat surface of the seatback may be impaired in outer appearance. Further, the seatback will inevitably become complex in structure, because the side supports are arranged on the seat surface and also because the wadding has a different thickness between the inner and outer side supports.

As described above, the air mats are deformed, supporting the occupant's shoulder blades. The air mats must therefore be incorporated in those parts of the pad, which exist at the left and right sides of the seat surface of the seatback. Inevitably, the seatback becomes complicated in structure.

An object of this invention is to provide a seat which provides a large contact area without complicating the structure of the seatback, making the occupant feel well fit in the seat.

SUMMARY OF THE INVENTION

To achieve the object specified above, this invention is based on the fact that the total length at the parts of the occupant's ribs and shoulder blades differs but a little. A seat according to the invention is designed to support the occupant, mainly at the occupant's ribs and the shoulder blades. The seat acquires a large contact area, merely by changing the shape of the seat surface of the seatback.

The seat according to claim 1 comprises a seat cushion and a seatback. The seatback has an upper half and a lower half formed integral with the upper half, the upper half of the seatback has a seat surface extending upward, first inclined backward and then inclined forward before a top part, the lower half is narrower than the upper half, the seat cushion has a U-notch, as seen from an upper surface side of the seat cushion, made in a middle part of a rear end and loosely holds the lower half of the seatback in the U-notch, and the seat cushion and the seatback are lifted or lowered, relative to each other without providing a gap between the rear end of the seat cushion and the lower end of the seatback, the rear end of the seat cushion bulges at left and right edges, the seat cushion is lifted and lowered by a seat lifter, and the seatback is secured to a strut, and the strut comprises a fixed pole and a movable pole able to move with respect to the fixed pole; and the seatback is secured to the movable pole and is lifted and lowered and inclines to the movable pole forward and backward.

In this invention of claim 1, it is based on the fact that the total length at the parts of the occupant's ribs and shoulder blades differs but a little. That is, the seat surface of the seatback curves in both the up-down direction and the left-right direction, to support the occupant's ribs and shoulder blades. Thus, the seatback can support the occupant at ribs and shoulder blades, along the seat surface of the seatback contacting the occupant's back at a large area between the back of the occupant and the seat surface of the seatback, at a lower contact pressure. Only the seat surface of the seatback has a special shape, and the internal structure of the seatback need not be complex in structure. The seat is thus simple in structure, and can yet make the occupant well fit in the seat, regardless of his or her physique (i.e., trunk width).

BRIEF DESCRIPTION OF THE DRAWINGS

FIG. 2A shows the contour of the seat surface of the seatback, which extends in the up-down direction;

FIG. 2B shows the contour of the seat surface, which extends in the left-right direction, taken along line 2B-2B shown in FIG. 1B;

FIG. 2C is shows the contour of the seat surface, which extends in the left-right direction, taken along line 2C-2C shown in FIG. 1B;

FIG. 3A is a perspective view of the seat cushion;

FIG. 3B is a plan view of the seat cushion;

FIG. 3C is a vertical sectional view of the seat cushion, taken along line 3C-3C shown in FIG. 3B;

FIG. 3D is a vertical sectional view of the seat cushion, taken along line 3D-3D shown in FIG. 3B;

FIG. 8A is a rear view of a seatback lifting/lowering mechanism;

FIG. 8B is a side view of the seatback lifting/lowering mechanism, as viewed in the direction of arrow 8B shown in FIG. 8A;

DETAILED DESCRIPTION OF THE INVENTION

Figure 1A:
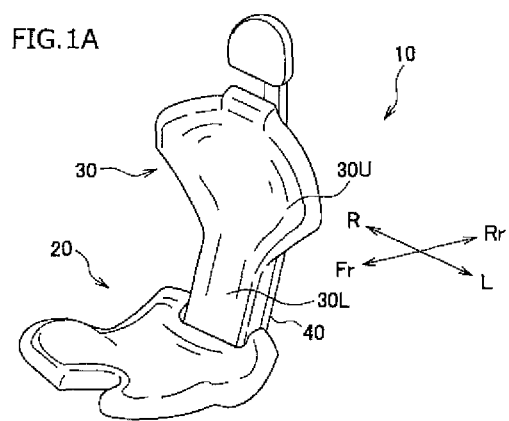
FIG. 1A is a perspective view showing a seat according to the embodiment of the invention.

An embodiment of this invention will be described in detail, with reference to the accompanying drawings. The embodiment is a vehicle seat. In the drawing, Fr and Rr indicate the forward and backward directions with respect to the driver seated in the driver seat, and L and R indicate the leftward and rightward directions with respect to the driver.

Figure 1B:
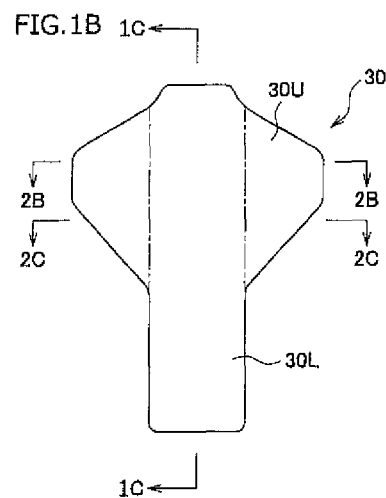
FIG. 1B is a front view of the seatback of the seat.
Figure 1C:
FIG. 1C is a vertical sectional view of the seatback, taken along line 1C-1C shown in FIG. 1B.

As shown in FIGS. 1A and 1B, the seat 10 is a vehicle seat, and comprises a seat cushion 20, a seatback 30, and a strut 40. The seatback 30 is secured to the strut 40 and isolated from the seat cushion.

As shown in FIGS. 1A and 1B, the upper half 30U and lower half 30L of the seatback 30 are shaped, greatly different in widths. The lower half 30L is narrower than the upper half 30U, and shaped like an elongate rectangle. That is, the upper half 30U of the seatback 30 has a part shaped like a trapezoid and extending from either side, and is therefor, broader than the lower half 30L in the left-right direction of the seat 10. The lower half 30L is narrower than the upper half 30U because it has not trapezoidal parts. The lower half 30L is designed to support, in the main, that part of the occupant, which lies between the hips and lower ribs. The upper half 30U supports, in the main, the shoulder blades of the occupant.

As shown in FIGS. 2A to 2C, the surface of the seatback 130 of the conventional seat does not extend up to the level where it may cover and support the occupant's shoulder blades from back. Further, the seat surface of the seatback 130 is shaped flat in the left-right direction of the seat, and does not wrap or support the occupant's left or right shoulder blade at the parts of the shoulder blade.

In this invention, the seat surface of the seatback 30 curves, bulging in the up-down direction, gradually upward along the occupant's shoulder blades, and recedes in the left-right direction, supporting the occupant's shoulder blades. Preferably, the seat surface of the seatback 30 extends to support the lower part of the occupant's neck in the up-down direction, thus supporting the same, and recedes at the parts 36' of the shoulder blade in the left-right direction.

As shown in FIGS. 2B and 2C, the seat surface of the seatback 30 gently recedes at the part 37' of the occupant's ribs, extending in the left-right direction. The seat surface of the seatback 30 much recedes at two parts 36' to support the occupant's left and right shoulder blades, and less bulges at the part lying between the two parts 36'.

That is, the seat surface of the seatback 30 extends upward, first gently inclined backward and then gently inclined forward shortly before the top part. The seat surface of the seatback 30 extends up, also along the occupant's shoulder blades 36, to the level where it may cover the shoulder blades from back. Moreover, the seat surface of the seatback 30 is shaped, extending along the occupant's left and right shoulder blades 36 and also along the occupant's ribs 37, in the left-right direction, too. Thus, the seat surface of the seatback 30 is curved in the up-down direction and left-right direction, along the occupant's shoulder blades 36 and ribs 37.

As described above, the seat surface of the seatback 30 curves in the up-down direction, gradually bulging along the occupant's shoulder blades, and recedes in the left-right direction, supporting the occupant's ribs 37. Further, in the up-down direction, the seat surface of the seatback 30 curves along the occupant's shoulder blades and extends to the level where it may cover the shoulder blades from back. In the left-right direction, the seat surface of the seatback 30 recedes at the occupant's left and right shoulder blades. Therefore, the occupant's shoulder blades 36 and ribs 37 can be supported on the seat surface of the seatback 30. The seat surface of the seatback can contact the occupant's back (i.e., shoulder blades and ribs) at a large area between the back of the occupant and the seat surface of the seatback, and the contact pressure is low. Only the seat surface of the seatback 30 has a special shape, and the internal structure of the seatback need not be complex in structure. Since the total length at the parts of the occupant's ribs and shoulder blades (i.e., trunk width) differs but a little, the occupant can feel well fit in the seat, regardless of his or her physique (i.e., trunk width) as he or she is supported, mainly at the ribs and shoulder blades.

Needless to say, the side supports may not be provided at the left and right edges of the seatback 30, respectively. If this is the case, the seat 10 is simplified in structure. Without side supports, the seat surface of the seatback 30 is simplified in shape, which enhances the outer appearance of the seat 10.

As shown in FIGS. 3A to 3D, the seat cushion unit 22 has a U-notch 22a in the middle part of the rear end. Thus, the rear end of the seat cushion unit 22 is shaped like letter U as seen from above, and has the left and right ends bulging upward from the bottom of the U-notch 22a. The U-notch 22a has a width in the left-right direction of the seat 10 and a length in the front-back direction of the seat which the lower half 30L of the seatback is loosely fitted.

In FIGS. 3C and 3D, HP indicates the hip point of the occupant.

As described above, the lower half 30L of the seatback is narrower than the upper half 30U of the seatback, and the U-notch 20a loosely holding the lower half 30L is cut in the middle part of the rear end of the seat cushion 20. No gap is provided between the rear end of the seat cushion and the lower end of the seatback even if the seat cushion and the seatback is lifted or lowered, relative to each other. Therefore, the seat cushion 20 and the seatback 30 can be lifted or lowered, relative to each other, in order to adjust the position of the seatback in accordance with the occupant's physique (i.e., height).

The seat cushion 20 and the seatback 30 may be configured to move up and down relative to each other. In this case, the seatback 30 (more precisely, the seat surface thereof) can be set to an optimal position for supporting the occupant at the ribs and shoulder blades, enabling the occupant to feel well fit in the seat, regardless of his or her physique (i.e., height).

The lower half 30L of the seatback 30 is thus made narrower than the upper half 30U, and the U-notch 20a for loosely holding the lower half 30L is made in the middle part of the rear end. This minor change in shape can adjust the position of the seatback (i.e., position of seat surface) in accordance with the occupant's physique (i.e., height).

The lower half 30L of the seatback 30 is loosely fitted in the U-notch 20a made in the middle part of the rear end of the seat cushion unit 22. Further, the left and right end parts 20b, defining the U-notch 20a, do not interfere with the seatback. The left and right end parts 20b can therefore have any shape desirable, without preventing the seat cushion 20 and the seatback 30 from moving up or down, relative to each other. The left and right end parts 20b extend upward. If they extend to a level higher than the U-notch 20a, the seat cushion 20 will may rap the occupant's buttocks from the sides. This prevents the occupant's buttocks from moving in the left-right direction of the seat 10. As a result, the occupant will feel his buttocks well fitted in the seat 10.

To move the seat cushion 20 and the seatback 30 up and down relative to each other, thereby to adjust the position of the seatback (more precisely, the seat surface thereof) in accordance with the occupant's physique (i.e., height), either the seat cushion or the seatback may be lifted or lowered, or both the seat cushion and the seatback may be lifted or lowered independently of each other.

The seat cushion 20 may be lifted and lowered by, for example, a seat lifter. The strut may be composed of a fixed pole and a movable pole that can move up and down with respect to the fixed pole. If secured to the movable pole, the seatback can move up and down.

The seat 10 may be configured to lift and lower either the seat cushion or the seatback. Alternatively, both the seat cushion and the seatback may be lifted and lowered.

An embodiment of this invention will be described in detail, with reference to the accompanying drawings. The embodiment is a vehicle seat. In the drawing, Fr and Rr indicate the forward and backward directions with respect to the driver seated in the driver seat, and L and R indicate the leftward and rightward directions with respect to the driver.

Figure 4:
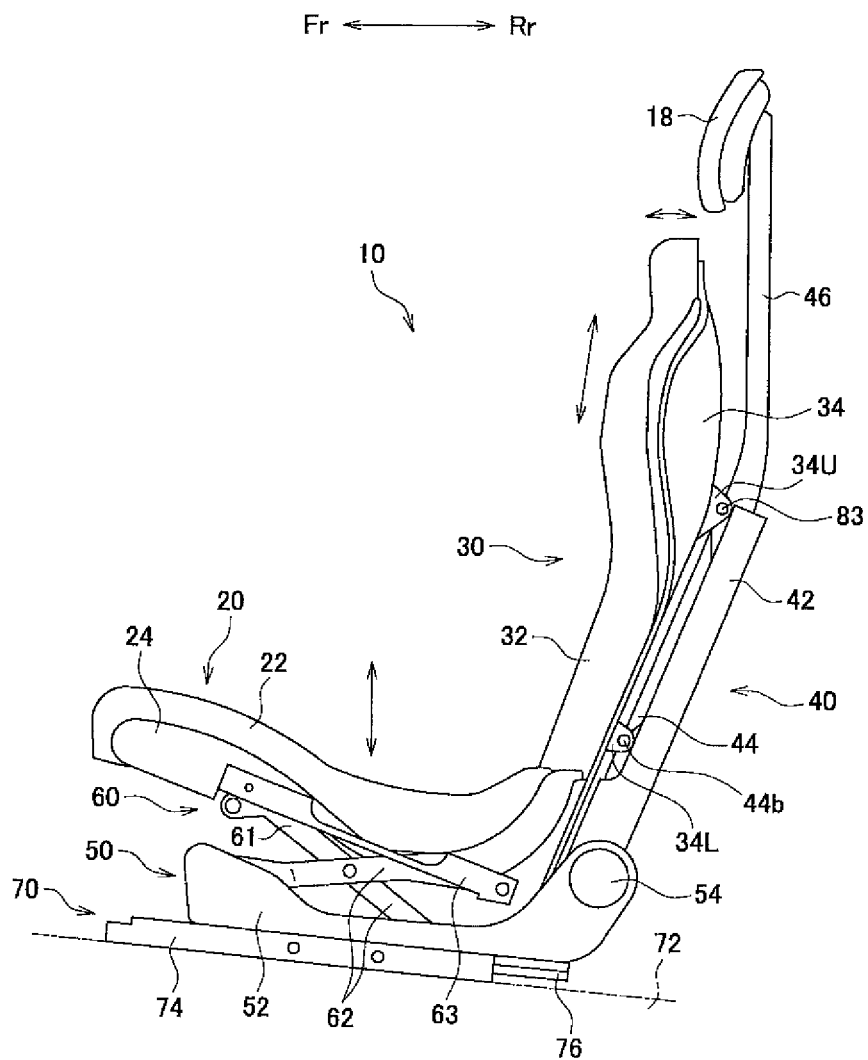
FIG. 4 is a left side view showing the seat capable lift and lower according to the embodiment of the invention.
Figure 5:
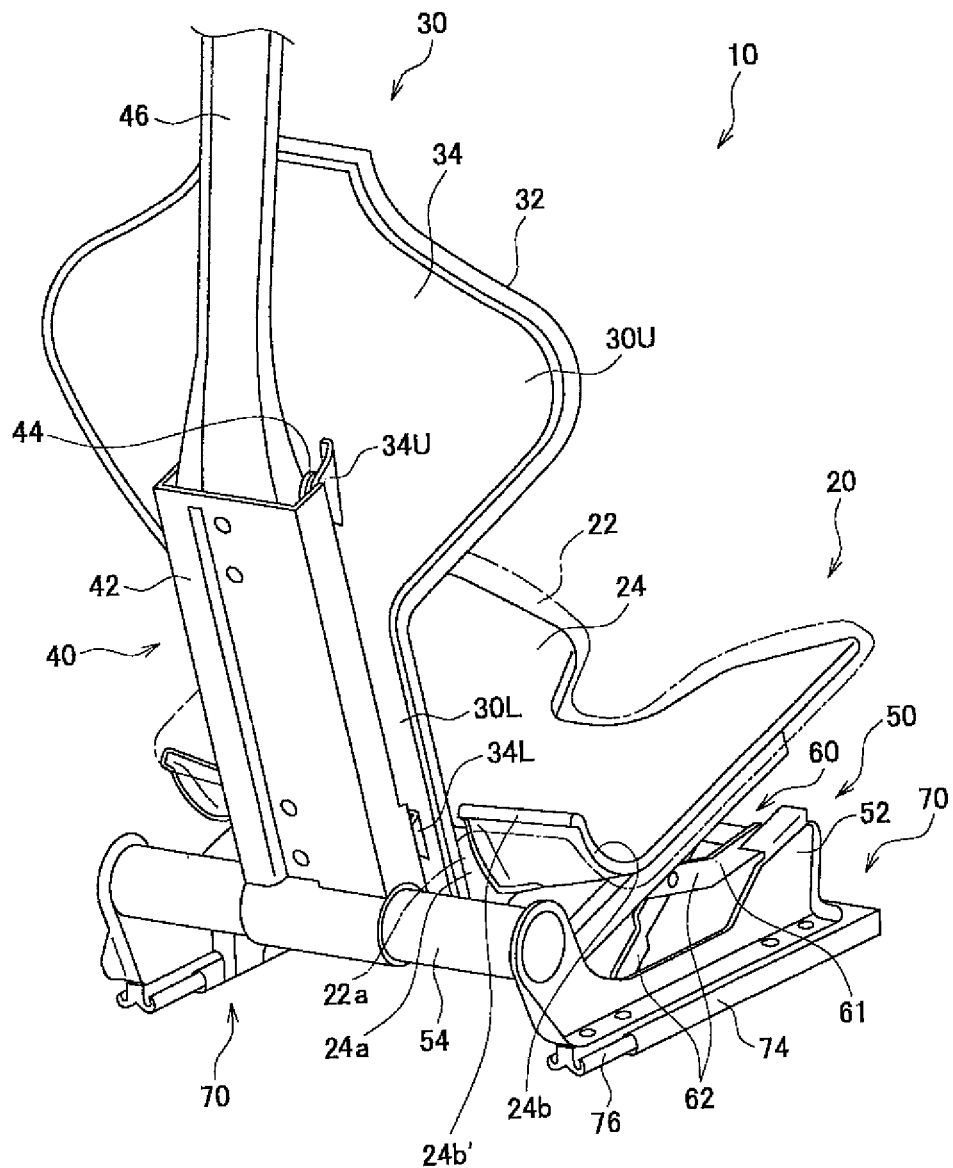
FIG. 5 is a partly sectional, perspective view showing the seat capable lift and lower according to the embodiment of the invention, as viewed from the back.

As shown in FIG. 4 and FIG. 5, the seat 10 is a vehicle seat, and comprises a seat cushion 20, a seatback 30, a strut 40, a riser 50 serving as base, a lifting/lowering means 60, and a seat sliding mechanism 70.

The seat cushion 20 comprises a seat cushion unit 22 composed of a pad and a trim cover covering the pad, and a cushion panel 24 holding the seat cushion unit 22. The seatback 30 comprises a seatback unit 32 composed of a pad and a trim cover covering the pad, and a back panel 34 holding the seatback unit 32. The cushion panel 24 and the back panel 34 are made of, for example, fiber-reinforced plastic (FRP). The seat cushion unit 22 is adhered to the upper surface of the cushion panel 24. The seatback unit 32 is adhered to the front surface of the back panel 34.

In FIG. 2, the seat cushion unit 22 is indicated by a one-dot, dashed line, specifying the shape of the cushion panel 24.

The seat sliding mechanism 70 is of the type known to the public. The seat sliding mechanism 70 includes fixed rails 74 secured to the vehicle floor 72 and movable rails 76 inserted in the fixed rails 74, respectively, to slide back and forth. To the movable rails 76, the riser 50 is secured, and is used as seat base. The riser 50 has left and right side frames 52, a front coupling member coupling the front ends of the left and right side frames, and a rear coupling member coupling the rear ends of the left and right side frames 52. The rear coupling member is a hollow rod 54.

The lifting/lowering means 60 includes a seat lifter 61 arranged between the seat cushion 20 and the riser 50. The seat lifter 61 is of a known type such as X link type. More precisely, the seat lifter 61 comprises a pair of links 62 fastened with a pin, forming an X-shaped member. The links 62 are secured, at upper end with a pin to an upper bar 63, and at lower end with a pin to a lower bar (not shown). Of these two pins, the front-side pin can slide back and forth. The upper bar 63 is secured to the lower surface of the cushion panel 24, and the lower bar is provided inside the side frames 52 of the riser 50. So configured and provided between the seat cushion 20 and the riser 50, the seat lifter 61 can lift and lower the seat cushion 20.

The strut 40 has its lower end mounted on, or welded to, the rear coupling member, i.e., hollow rod 54 that couples the rear ends of the left and right side frames of the riser 50. Thus, the strut 40 is secure to the hollow rod 54, extending substantially upright (more precisely, incline rearward a little).

The strut 40 includes a main unit 42 and a movable pole 44. The main unit 42 is welded, at lower end, to the riser 50. The movable pole 44 is incorporated in the main unit 42, able to slide up and down. A pair of brackets 34U and another pair of brackets 34L are provided at the back of the back panel 34. The brackets 34U are vertically spaced from the brackets 34L. The brackets of either pair are spaced sidewise by the width of the movable pole 44. The brackets 34U and the brackets 34L secure the back panel 34 to the movable pole 44, and the seatback 30 can therefore slide up and down, together with the movable pole.

A strut 46 is secured to the back of the back panel 34. A headrest 18 is secured to the top of the strut 46. The headrest 18 can therefore be moved up and down together with the seatback 30, as the movable pole 44 is moved up and down.

The strut 46 is secured to the back of the back panel 34, and needs only to move up and down together with the seatback 30. It may be secured to the back of the back panel 34, by an appropriate method available.

As shown in FIG. 4, on the back of the back panel 34, the lower brackets 34L are provided at a lower part of the back panel 34, and the upper brackets 34U are provided at a little above the middle section of the back panel 34.

In this embodiment, the seat lifter 61 lifts or lowers the seat cushion 20 with respect to the seatback 30, and a lifting/lowering mechanism other than the seat lifter 61 lifts or lowers the seatback with respect to the seat cushion. That is, the lifting/lowering means 60 includes a lifting/lowering mechanism (seatback lifting/lowering mechanism) 64, in addition to the seat lifter 61.

Figure 6:
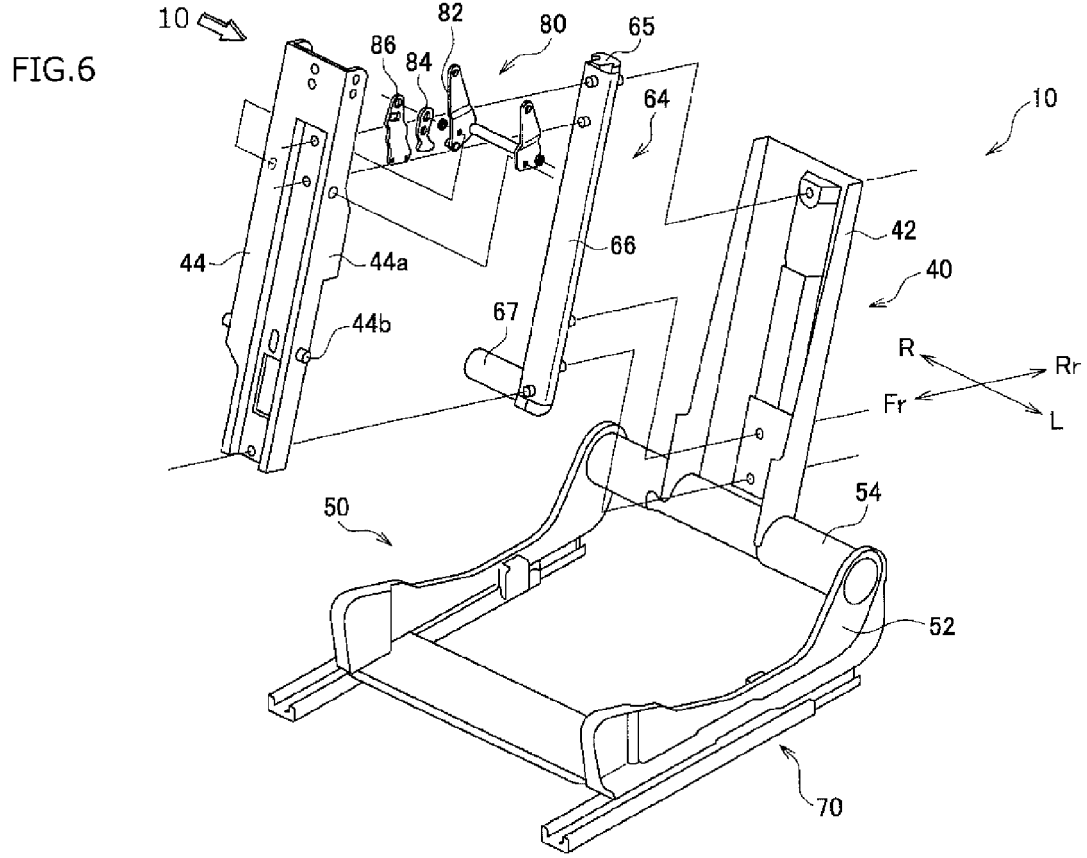
FIG. 6 is an exploded, perspective view of the seat capable lift and lower according to the embodiment of the invention, showing neither the seat cushion nor the seatback.

As may be seen from FIG. 6 and FIGS. 8A and 8B, the seatback lifting/lowering mechanism 64 is based on the seat sliding mechanism known to the public. The mechanism 64 includes a fixed rail 65 and a movable rail 66 covering the fixed rail 65. The mechanism 64 is identical in configuration to the known seat sliding mechanism, except that the fixed rail 65 is provided inside the movable rail 66. Instead, the movable rail 66 may, of course, be provided inside the fixed rail 65.

The seat siding mechanism of the known type is configured to slide back and forth. By contrast, the seatback lifting/lowering mechanism 64 is configured to slide in vertical direction (thus able to move up and down).

The seatback lifting/lowering mechanism 64 is similar to the known seat sliding mechanism in basic configuration, and will not described in detail. In this embodiment, a motor 67 is mounted on the fixed rail 65, though not described here in detail. The driving force of the motor 67 is reduced and rotates a pinion gear (not shown) meshed with the lack (not shown) provided on the movable rail 66. Hence, if the motor 67 is driven, the movable rail 66 will move up or down along the fixed rail 65, while being guided by the fixed rail 65.

Figure 7:
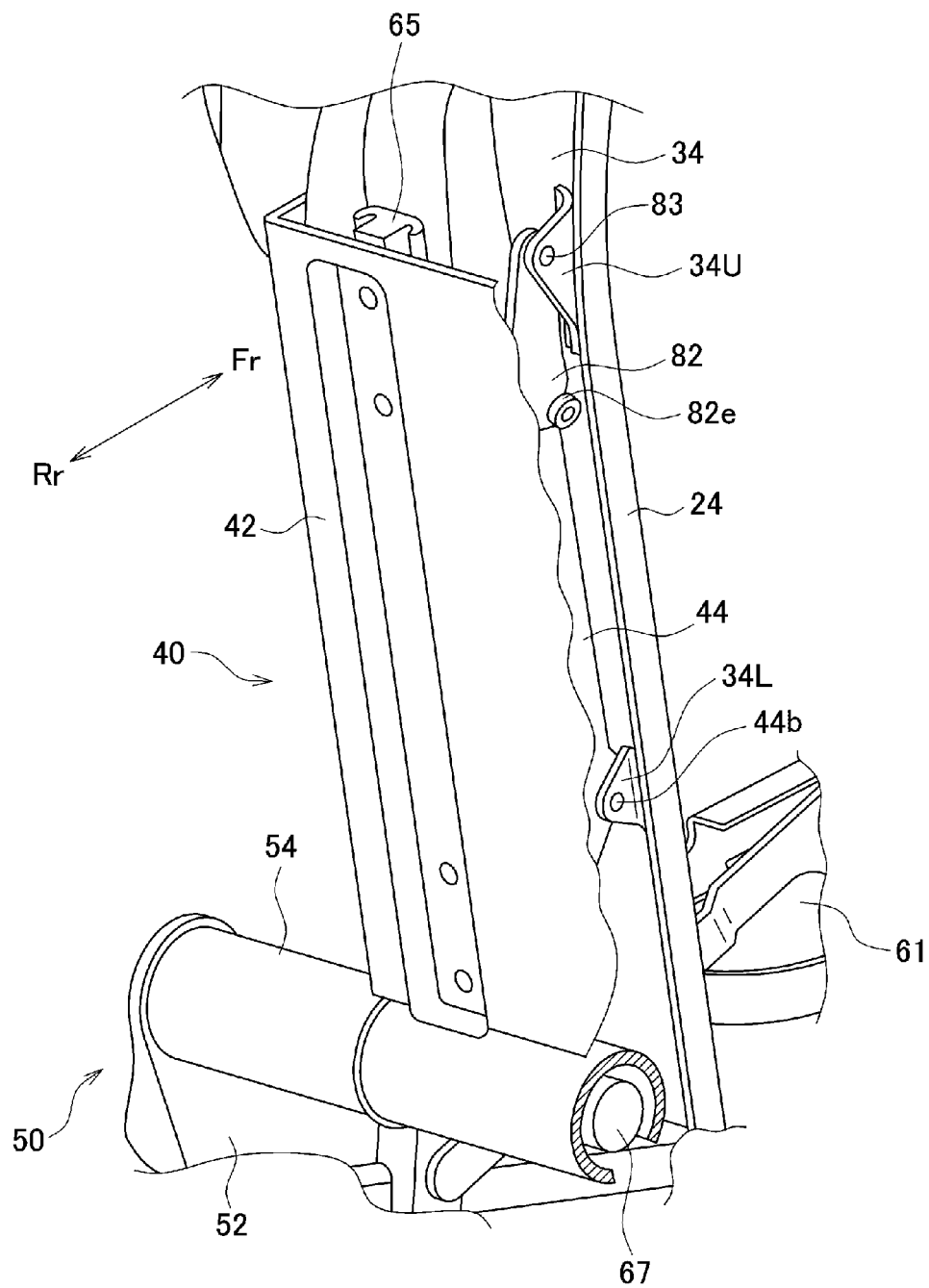
FIG. 7 is a magnified, partly sectional perspective view of the seat, as viewed from the back.

In the embodiment, the rear coupling member 54 coupling the rear ends of the left and right side frames 52 of the riser is a hollow rod. As shown in FIG. 7, the motor 67 of the seatback lifting/lowering mechanism 64 is incorporated in the hollow rod. The motor 67 is therefore concealed, not impairing the outer appearance of the seatback lifting/lowering mechanism 64.

The main unit 42 of the strut 40 is fastened to the fixed rail 65 and the movable pole 44 is fastened to the movable rail 66, for example by using bolts, respectively. The main unit 42 and the movable pole 44 have a U-shaped cross section, respectively. The main unit 42 opens at front, and its front is covered with the movable pole 44. The seatback lifting/lowering mechanism 64 is arranged between the main unit 42 and the movable pole 44.

Using a seat sliding mechanism of known type, the seatback lifting/lowering mechanism 64 can be small and light, and can yet easily move the movable pole 44 with respect to the main unit 42 of the strut 40. Secured to the movable pole 44, the seatback 30 is lifted or lowered, together with the movable pole. The seatback 30 can therefore be adjusted in the position of the seat surface, in accordance with the occupant's physique. This makes the occupant feel well fit in the seat.

The lower half 30L of the seatback is made narrower than the upper half 30U. The U-notch 20a is made in the middle part of the rear end of the seat cushion, and loosely holds the narrow lower half of the seatback. Therefore, no gap will be made between the rear end of the seat cushion and the lower end of the seatback even if the seatback 30 is lifted or lowered and thereby the seatback can be adjusted in position in accordance with the occupant's physique.

Moreover, the lower half 30L of the seatback 30, which is narrower than the upper half 30U, is loosely fitted in the U-notch 20a that is made in the middle part of the rear end of the seat cushion. Hence, the left and right end parts 20b, defining the U-notch 20a between them, does not interfere with the seatback 30, and the seatback 30 can be lifted and lowered without interfering with the seat cushion 20.

Needless to say, the seatback 30 can be adjusted in position in accordance with the occupant's physique, not impairing the occupant's feeling of being well fit in the seat 10, even when the seat lifter 61 lifts or lowers the seat cushion 20. Even after the seat cushion 20 has been lifted or lowered, no gap is made between the rear end of the seat cushion and the lower end of the seatback. Further, the seat cushion can be lifted and lowered, never interfering with the seatback 30.

As shown in FIG. 6, two pins 44b protrude from the left and right walls 44a of the movable pole. The pins 44b are pivotally held, respectively in two support holes made in the left and right lower brackets 34L provided on the lower part of the back of the back panel 34.

Figure 9:
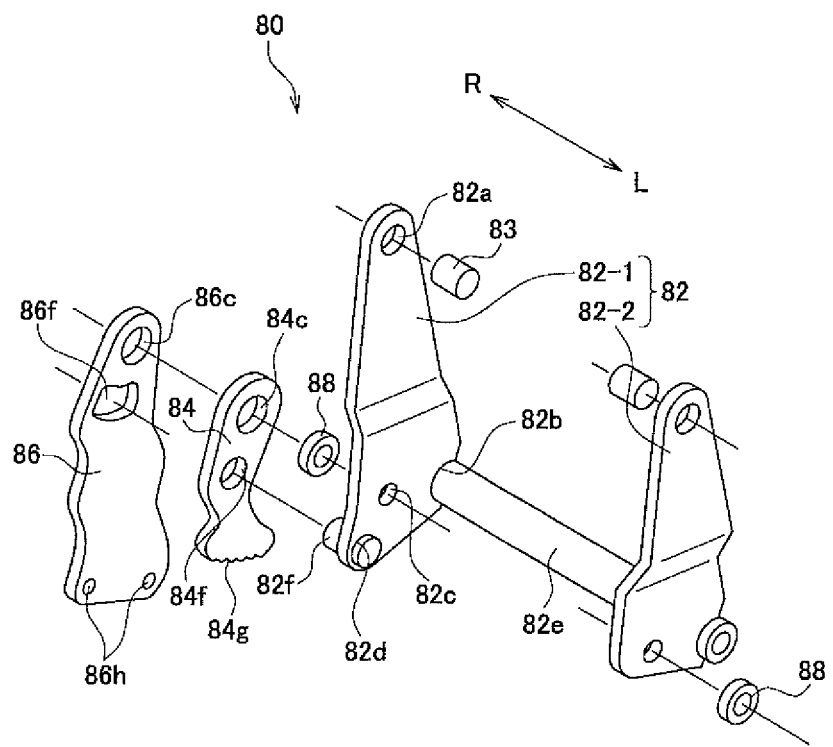
FIG. 9 is an exploded, perspective view of a seatback inclining mechanism.

As shown in FIG. 9, the seat 10 further comprises an inclination mechanism 80 for the seatback configured to incline the seatback 30. The inclination mechanism 80 is provided on the movable pole 44, at a position well above the pins 44b protruding from the walls of the movable pole.

Figure 10:
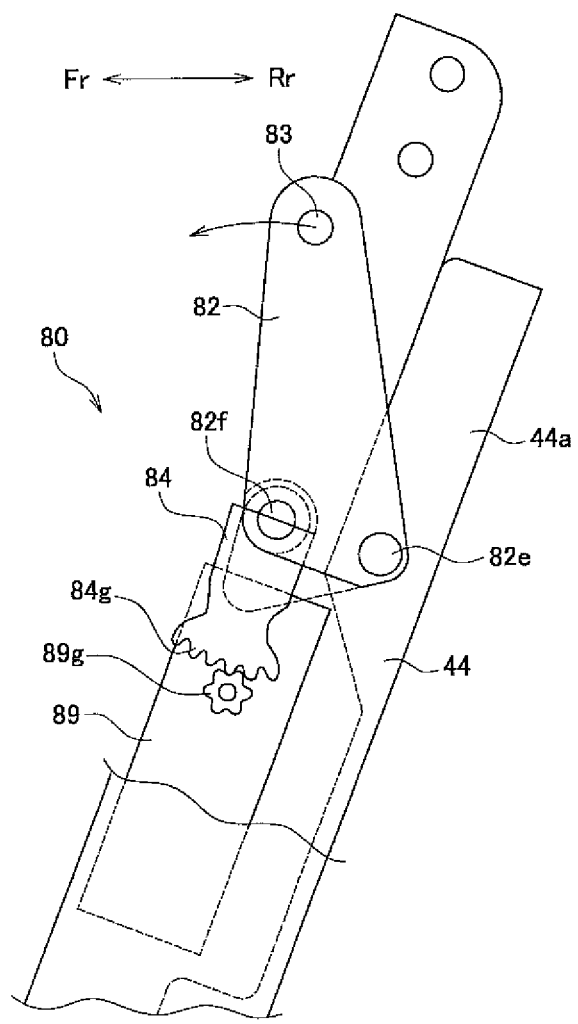
FIG. 10 is a partly sectional side view of a sheet, as viewed in the direction of arrow 10 shown in FIG. 6.

As shown in FIGS. 6, 9 and 10, the inclination mechanism (or seatback inclining mechanism) 80 includes a main link 82, a drive link 84, and a regulation link 86. The main link 82 is composed of a pair of main links (or first and second main links) 82-1 and 82-2.

Each of the first and second main links 82-1 and 82-2 has one support hole 82a in one end (upper end), and two support holes 82b and 82c in the other end (lower end, or free end). The firs main link 82-1 has another support hole 82d made in a corner of the lower end (free end) of the first main link 82-1.

A connecting rod 82e has its ends fitted, respectively in the support holes 82b made in the lower ends of the first and second main links 82-1 and 82-2. The first main link 82-1 and the second main link 82-2 are thereby coupled and can be moved together. Pins 83 pass through the support holes 82a and are pivotally supported, by the left and right brackets 34U provided at the upper part of the back of the back panel 34 (see FIG. 7). A pin (rotation control pin) 82f is fitted in the support hole 82d made in a lower corner of the first main link 82-1.

The drive link 84 and the regulation link 86 are arranged outside the first main link 82-1. A support hole 84c is made in the upper end of the drive link 84, and a support hole 86c is made in the upper end of the regulation link 86. Step pins (not shown) extend outwards from the left and right walls 44a of the movable pole, passing through the support holes 84c and 86c and a washer 88, and then through the support hole 82c of the first main link 82-1, and is pivotally supported by the side walls 44a of the movable pole. A step bolt (not shown) extends from outside, passing through another washer 88 and the support hole 82c of the second main link 82-2, and is secured to the side walls 44a of the movable pole 44. The main link 82 is thereby arranged between the left and right side walls of the movable pole 44.

Holes 84f and 86f, in which the rotation control pin 82f extending from the first main link 82-1 is inserted, are made in the drive link 84 and the regulation link 86, respectively. A section gear 84g is provided at the lower end of the drive link 84. The hole 86f of the regulation link 86 is an elongated hole arching around the support hole 86c made in the upper end of the regulation link.

The step pin extends through the support hole of the support hole 82c of the first main link 82-1, the support hole 84c of the drive link 84 and the support hole 86c of the regulation link 86. Further, the rotation control pin 82f extends from the first main link 82-1 and is inserted in the hole 84f of the drive link. The drive link 84 and the main link 82 can therefore rotate together.

Since the rotation control pin 82f is inserted in the arching elongated hole 86f of the regulation link 86, the rotation of the drive link 84 and main link 82 is limited to the distance the rotation control pin 82f moves in the elongated hole 86f.

Two holes 86h are made in the lower end of the regulation link 86. Using these holes 86h, the regulation link is bolted to the movable pole 44.

As shown in FIG. 10, an actuator 89 incorporating a motor (not shown) is secured to the movable pole 44. The section gear 84g of the drive link extends into the actuator 89 and is set in screw engagement with a pinion gear 89g. The drive link 84, which has the section gear 84g set in mesh with the pinion gear, rotates when the pinion gear 89g is rotated by the motor. As a result, the main link 82 rotates together with the drive link.

The pins 44b protruding from the left and right walls 44a of the movable pole 44, respectively, are pivotally supported in the support holes of the lower brackets 34L provided on the back panel. The back panel 34 can therefore incline forward and backward (or rotate) around the pins 44b pivotally, as much as allowed by the rotation control pin 82f and the elongated hole 86f.

A torque limiter (not shown) is provided on the actuator 89 and arranged between the motor and the pinion gear 89g, and therefore controls the output of the motor.

The main link 82 and the drive link 84, which rotate together, may be formed integral.

In other words, the drive link 84 may not be used, and the first main link 82-1 may extend downward from the rotation control pin 82f, and the section gear 84g may be provided on the lower edge of the first main link 82-1. Further, the rotation control pin 82f may be inserted directly into the elongated hole 86f. In this case, the back panel 34 can rotate forward and backward around the pins 44b pivotally, as much as allowed by the rotation control pin and the elongated hole.

In this configuration, the inclination mechanism 80 can be simplified in structure because the drive link 84 is not at all.

The lower brackets 34L are provided on the lower end of the back panel 34, and the seatback 30 is inclined (or rotated) around the pins 44b pivotally supported by the lower brackets 34L. That is, the center of rotation is set at the lower end of the seatback 30. This suppresses the back-and-forth motion of the lower half 30L of the seatback, which supports that part of the occupant, lying between the hips and lower ribs, even if the seatback 30 is inclined. The inclination of the seatback can therefore be adjusted without increasing the interference between the U-notch 20a made in the rear end of the seat cushion and the lower end of the seat back 30.

The torque limiter controls the output of the motor, which is transmitted to the pinion gear 89g. If another vehicle hits the rear of the vehicle having the seat 10, imposing an impact on the seat 10. In this case the pinion gear 89g slips, inclining the seatback 30 while absorbing the impact energy. This moderates the impact applied to the occupant, ensuring the safety of the occupant.

The back panel 34 is lifted or lowered, together with the movable pole 44, along the main unit (fixed pole) 42, in accordance with the occupant's physique(height), without impairing the occupant's feeling of being well fit in the seat 10. Hence, not only can the seatback 30 be adjusted in position, but also can the back panel 34 incline to the movable pole.

If the seatback 30 is inclined at the position to which it has been lifted or lowered, the seatback can be further adjusted in position in accordance with the occupant's physique (height), without impairing the occupant's feeling of being well fit at the seat surface of the seatback.

In the embodiment, the lifting/lowering means 60 configured to lift and lower the seat cushion 20 and the seatback 30, relative to each other, includes the seat lifter 61 for the seat cushion in addition to the seatback lifting/lowering mechanism 64. Further, the seat cushion 20 and the seatback 30 are configured to be lifted and lowered, independently of each other. Hence, the seat cushion 20 and the seatback 30 can be lifted and lowered relative to each other, for a longer distance. This reliably adjusts the seatback in position in accordance with the occupant's physique (height). Both an occupant much bigger than average persons and an occupant much smaller than average persons can feel well fit in the seat 10.

If lifted by the seat lifter 61, the seat cushion 20 will move back and forth. Nonetheless, the inclination mechanism 80 for the seatback 30 can adjust the inclination of the seatback. This gives the occupant a line of sight appropriate for his or her physique. The occupant can therefore feel fit in the seat 10, regardless of his or her physique, even while the seat lifter 61 is operating.

The inclination mechanism 80 for the seatback may be provided directly on the main unit 42, not on the movable pole 44, and the seatback 30 may be provided on the main unit 42 and may be inclined. In this case, the seatback will be adjusted in position in accordance with the occupant's physique (height) if the seat lifter 61 lifts or lowers the seat cushion 20.

If the conventional seatback, which is composed of upper and lower halves, is lifted, a gap will exist between the upper and lower halves, and the occupant will no longer feel well fit on the seatback. By contrast, the seatback 30 of this invention is a single-piece product, never to have a gap even if it is lifted or lowered. This ensures the occupant a well-fit feeling on the seat surface of the seatback.

The strut 46, which has the headrest 18 on the top and is secured to the movable pole 44, is lifted or lowered together with the seatback 30, whereby the headrest is lifted or lowered. The headrest 18 can therefore support the occupant's head, not impairing the occupant's feeling of being well fit in the seat 10, even if the seat surface of the seatback 30 is adjusted in position in accordance with the occupant's physique.

As described above, the seat according to this invention can support the occupant, mainly at the ribs and shoulder blades, making the occupant feel well fit in the seat, regardless of his or her physique (i.e., trunk width).

Further, the lower half of the seatback may be formed narrower than the upper half, and the seat cushion may have a U-notch made in the middle part of the rear end thereof.

In this case, no gap will be provided between the rear end of the seat cushion and the lower end of the seatback. Hence, the seatback can be adjusted in position (i.e., position of its surface) in accordance with the occupant's physique (i.e., height), if the seat cushion and the seatback are lifted and lowered relative to each other.

While an embodiment of the invention has been described, it has been presented by way of example only, and is not intended to limit the scope of the invention. Any change and modification made within the scope of the invention are, of course, included in the present invention.

The embodiment described above is a vehicle seat, as in most cases. However, the present invention can be modified as any seats that have a seat cushion and a seatback, and is not limited to a vehicle seat.

One example of the lifting/lowering means of the seat cushion and the seatback and the seat sliding mechanism 70 can be disclosed below.

1. The seat further comprises an inclination mechanism configured to incline the seatback forward with respect to the strut, and setting a rotation center of the seatback at the lower part of the back of the seatback.

2. The lifting/lowering means includes a seat lifter provided between the riser and the seat cushion and configured to lift and lower the seat cushion.

3. The strut includes a fixed main unit coupled at the lower end to the rear end of the riser, and a movable pole securing the seatback at the front and guided by and slided along the fixed main unit; and the lifting/lowering means includes a seatback lifting/lowering mechanism which is configured to lift and lower the seatback and the movable pole, which has a fixed rail and a movable rail, the fixed rail is secured to the fixed main unit, and the movable rail is mounted on or in, guided by and slided along the fixed rail.

4. The strut includes a fixed main unit coupled at the lower end to the rear end of the riser, and a movable pole securing the seatback at the front and guided by and slided along the fixed main unit, and the lifting/lowering means; and the lifting/lowering means includes a seat lifter provided between the riser and the seat cushion and configured to lift and lower the seat cushion and a seatback lifting/lowering mechanism which is configured to lift and lower the seatback and the movable pole, which has a fixed rail and a movable rail, the fixed rail is secured to the fixed main unit, and the movable rail is mounted on or in, guided by and slided along the fixed rail.

5. The seat further comprises an inclination mechanism configured to incline the seatback forward with respect to the strut, and setting a rotation center of the seatback at the lower part of the back of the seatback.

6. The seat further comprises left brackets and right brackets provided on a middle part and lower end of the back of the seatback, respectively, and spaced apart in up-down direction, and a pair of pins extending from the movable pole and pivotally supported on the lower brackets of the back of the seatback, respectively, and serving as rotation center of the seatback.

The inclination mechanism includes: first and second main links pivotally supported, by pins, on the upper brackets provided on the seatback, and connected together, at one end, by a connecting rod; a drive link secured to the other end of the first main link and having a section gear at a free end; a regulation link secured to the other end of the first main link, outside the drive link; an actuator incorporating a motor having a pinion gear, secured to the movable pole and configured to drive the pinion gear and set in mesh with the section gear of the drive link, to rotate the drive link and the main link, thereby to incline the seatback with respect to the movable pole; and a pin extending from the other end of the first main link and passing through two holes made in the drive link and the regulation link, respectively, the hole made in the regulation link being an arching elongated hole.

7. The seat further comprises left brackets and right brackets provided on a middle part and lower end of the back of the seatback, respectively, and spaced apart in up-down direction, and a pair of pins extend from the movable pole and pivotally supported on the lower brackets of the back of the seatback, respectively, and serving as rotation center of the seatback.

The inclination mechanism includes: first and second main links pivotally supported, by pins, on the upper brackets provided on the seatback, and connected together, at one end, by a connecting rod and the first main link having a section gear at a free end; a regulation link secured to the other end of the first main link, outside the first main link; an actuator incorporating a motor having a pinion gear, secured to the movable pole and configured to drive the pinion gear and set in mesh with the section gear of the first main link, to rotate the main link, thereby to incline the seatback with respect to the movable pole; and a pin extending from the other end of the first main link and passing through a hole made in the regulation link, the hole being an arching elongated hole.

8. The actuator of the inclination mechanism has a torque limiter that controls the output of the motor, and transmits the output so controlled to the pinion gear.

9. The seat is a vehicle seat which is mounted on the riser arranged on the vehicle floor via a seat sliding mechanism or not.

What is claimed is:

1. A seat comprising:
   a seat cushion; and
   a seatback having an upper half and a lower half formed integral with the upper half;
   wherein the upper half of the seatback has a seat surface extending upward, first inclined backward and then inclined forward before a top part;
   the lower half is narrower than the upper half;
   the seat cushion has a U-notch, as seen from an upper surface side of the seat cushion, made in a middle part of a rear end and loosely holds the lower half of the seatback in the U-notch, and the seat cushion and the seatback are lifted or lowered, relative to each other without providing a gap between the rear end of the seat cushion and the lower end of the seatback;
   the rear end of the seat cushion bulges at left and right edge;
   the seat cushion is lifted and lowered by a seat lifter; and
   wherein the seatback is secured to a strut, and the strut comprises a fixed pole and a movable pole able to move with respect to the fixed pole; and the seatback is secured to the movable pole and is lifted and lowered and inclines to the movable pole forward and backward.

2. A seat comprising:
   a seat cushion; and
   a seatback having an upper half and a lower half formed integral with the upper half;
   wherein the upper half of the seatback has a seat surface extending upward, first inclined backward and then inclined forward before a top part;
   the lower half is narrower than the upper half;
   the seat cushion has a U-notch, as seen from an upper surface side of the seat cushion, made in a middle part of a rear end and loosely holds the lower half of the seatback in the U-notch, and the seat cushion and the seatback are lifted or lowered, relative to each other without providing a gap between the rear end of the seat cushion and the lower end of the seatback;
   the rear end of the seat cushion bulges at left and right edge; and
   the seatback is secured to a strut, and the strut comprises a fixed pole and a movable pole able to move with respect to the fixed pole; and the seatback is secured to the movable pole and is lifted and lowered and inclines to the movable pole forward and backward.

3. A seat comprising:
   a seat cushion; and
   a seatback having an upper half and a lower half formed integral with the upper half;

wherein the upper half of the seatback has a seat surface extending upward, first inclined backward and then inclined forward before a top part;

the lower half is narrower than the upper half;

the seat cushion has a U-notch, as seen from an upper surface side of the seat cushion, made in a middle part of a rear end and loosely holds the lower half of the seatback in the U-notch, and the seat cushion and the seatback are lifted or lowered, relative to each other without providing a gap between the rear end of the seat cushion and the lower end of the seatback;

a surface of a middle part of the upper half is further receded;

the rear end of the seat cushion bulges;

the seat cushion is lifted and lowered by a seat lift; and the seatback is secured to a strut, and the strut comprises a fixed pole and a movable pole able to move with respect to the fixed pole; and the seatback is secured to the movable pole and is lifted and lowered and inclines to the movable pole forward and backward.

4. A seat comprising:

a seat cushion; and a seatback having an upper half and a lower half formed integral with the upper half;

wherein the upper half of the seatback has a seat surface extending upward, first inclined backward and then inclined forward before a top part;

the lower half is narrower than the upper half;

the seat cushion has a U-notch, as seen from an upper surface side of the seat cushion, made in a middle part of a rear end and loosely holds the lower half of the seatback in the U-notch, and the seat cushion and the seatback are lifted or lowered, relative to each other without providing a gap between the rear end of the seat cushion and the lower end of the seatback;

a surface of a middle part of the upper half is further receded;

the rear end of the seat cushion bulges; and the seatback is secured to a strut, and the strut comprises a fixed pole and a movable pole able to move with respect to the fixed pole; and the seatback is secured to the movable pole and is lifted and lowered and inclines to the movable pole forward and backward.

* * * * *